US012626451B2

(12) United States Patent　　(10) Patent No.:　US 12,626,451 B2
Zhang　　(45) Date of Patent:　May 12, 2026

(54) MULTI-VIEW IMAGE GENERATION APPARATUS AND METHOD, AND GRAPHICS PROCESSING UNIT

(71) Applicant: Glenfly Tech Co., Ltd., Shanghai (CN)

(72) Inventor: Huaisheng Zhang, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 204 days.

(21) Appl. No.: 18/678,830

(22) Filed: May 30, 2024

(65) Prior Publication Data

US 2025/0252657 A1　　Aug. 7, 2025

(30) Foreign Application Priority Data

Feb. 4, 2024　(CN) .......................... 202410161229.7

(51) Int. Cl.
*G06T 15/10*　　(2011.01)
*G06T 15/00*　　(2011.01)
(52) U.S. Cl.
CPC ............ *G06T 15/10* (2013.01); *G06T 15/005* (2013.01)
(58) Field of Classification Search
CPC ....... G06T 15/10; G06T 15/005; G06T 15/00; G06T 1/20; Y02D 10/00
See application file for complete search history.

(56) References Cited

U.S. PATENT DOCUMENTS

2017/0323469 A1*　11/2017　Hakura ................ H04N 13/111
2019/0236827 A1*　8/2019　Hakura ................... G06T 17/10

* cited by examiner

*Primary Examiner* — Kee M Tung
*Assistant Examiner* — Thang Gia Huynh
(74) *Attorney, Agent, or Firm* — Nixon Peabody LLP

(57)　　ABSTRACT

The present disclosure relates to a multi-view image generation apparatus and method, and a graphics processing unit. Waves are constructed according to primitive information and vertex information of geometric primitives to generate a plurality of waves for parallel processing, and the waves are scheduled by a wave management unit for execution, which can improve execution efficiency. Since the primitive information of the geometric primitives is stored in a first cache unit, data sharing between waves can be implemented. During the parallel processing of the waves, vertex information in a second cache unit is updated in real time according to vertex address information outputted by the waves, so that a raster processing unit can read the latest vertex information from the second cache unit. Finally, through an image generation unit, a multi-view image is generated according to image colors obtained by executions of the waves and views corresponding to pixel points.

19 Claims, 5 Drawing Sheets

| | Valid | Prim_Num | Vtx_Num | Bnh_Num | Wv_Num | vertex_id in VC | | | | |
|---|---|---|---|---|---|---|---|---|---|---|
| 0 | 1 | 60 | 170 | 5 | 10 | $vcid_0$ | $vcid_1$ | ········· | $vcid_{190}$ | $vcid_{191}$ |
| 1 | 1 | 42 | 66 | 2 | 4 | | | ········· | | |
| | | | ········· | | | | | | | |
| m-2 | 0 | 0 | 0 | 0 | 0 | | | ········· | | |
| m-1 | 0 | 0 | 0 | 0 | 0 | | | ········· | | |

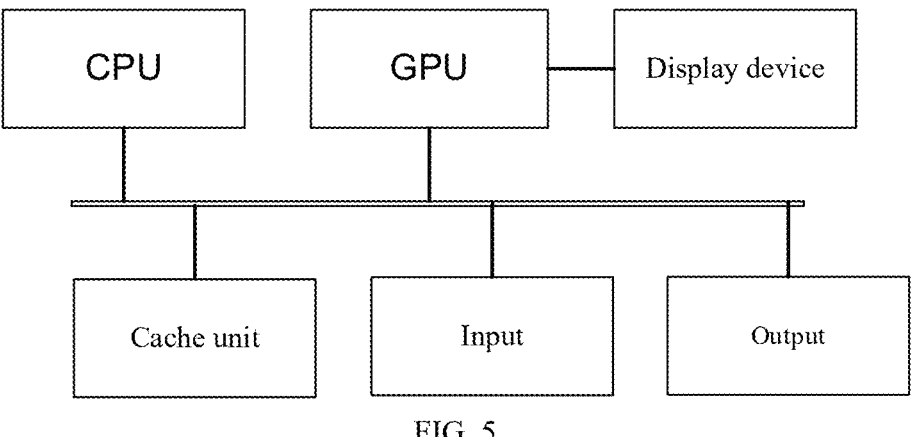

FIG. 5

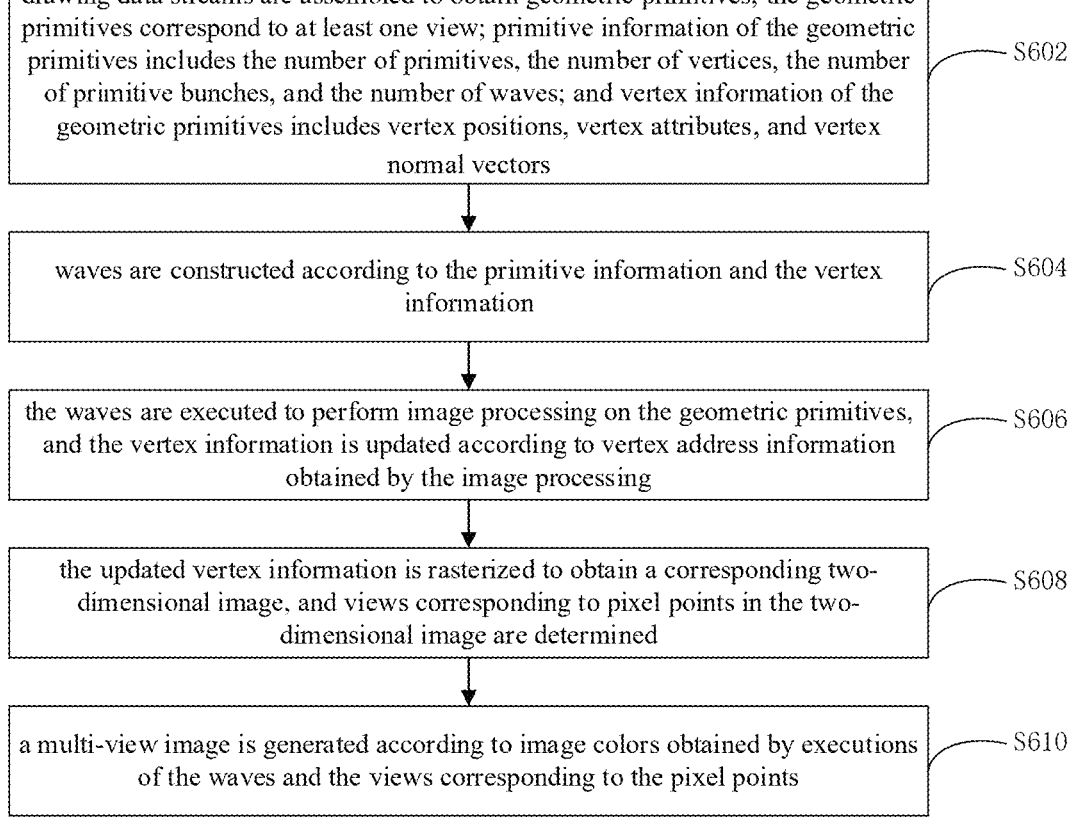

drawing data streams are assembled to obtain geometric primitives; the geometric primitives correspond to at least one view; primitive information of the geometric primitives includes the number of primitives, the number of vertices, the number of primitive bunches, and the number of waves; and vertex information of the geometric primitives includes vertex positions, vertex attributes, and vertex normal vectors — S602 waves are constructed according to the primitive information and the vertex information — S604 the waves are executed to perform image processing on the geometric primitives, and the vertex information is updated according to vertex address information obtained by the image processing — S606 the updated vertex information is rasterized to obtain a corresponding two-dimensional image, and views corresponding to pixel points in the two-dimensional image are determined — S608 a multi-view image is generated according to image colors obtained by executions of the waves and the views corresponding to the pixel points — S610

FIG. 6

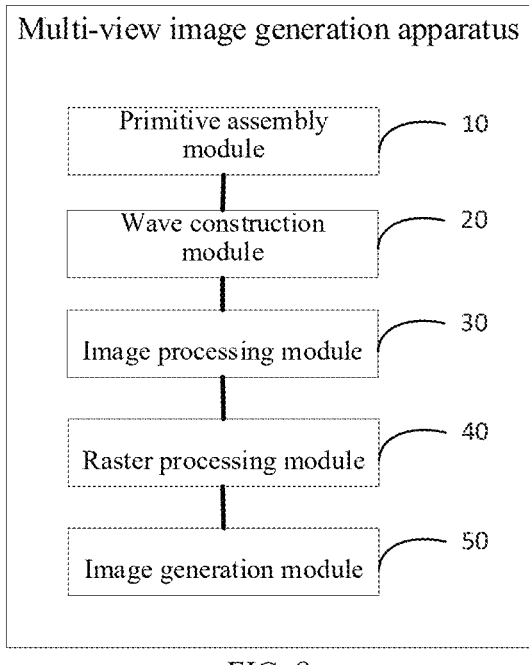

Multi-view image generation apparatus

| Primitive assembly module | — 10 |

| Wave construction module | — 20 |

| Image processing module | — 30 |

| Raster processing module | — 40 |

| Image generation module | — 50 |

FIG. 8

Memory

| Processor | Internal storage | Operating system |
| | | Computer program |
| | | Non-transitory storage medium |

System bus

Input/output interface

| Input device | Communication interface | Display unit |

Computer device

FIG. 9

MULTI-VIEW IMAGE GENERATION APPARATUS AND METHOD, AND GRAPHICS PROCESSING UNIT

CROSS REFERENCES TO RELATED APPLICATION

The present application claims priority to Chinese patent application No. 202410161229.7, titled "Multi-View Image Generation Apparatus and Graphics Processing Unit", and filed on Feb. 4, 2024, the content of which is hereby incorporated by reference in its entirety.

TECHNICAL FIELD

The present disclosure relates to the field of image drawing technologies, and particularly to a multi-view image generation apparatus and method, and a graphics processing unit (GPU).

BACKGROUND

In the virtual reality technology, there is generally a need to generate images from left and right viewpoints. For a certain scene, drawing tasks (including a front end (FE) and a back end (BE)) for generating left and right images are the same, except that respective view transformation matrices are different.

In the related technologies, since the drawing and computation are performed for the left and right viewpoints respectively, outputted to two images, and then displayed. Accordingly, the calculation process is complicated, which may result in lower drawing efficiency.

SUMMARY

In view of this, in order to address the above technical problems, it is necessary to provide a multi-view image generation apparatus and method, and a GPU capable of improving the image drawing efficiency.

In the first aspect of the present disclosure, a multi-view image generation apparatus is provided, which includes: a processing unit, a wave construction unit, a wave management unit, an execution unit (EU), a first cache unit, a second cache unit, a raster processing unit, and an image generation unit; the processing unit is configured to assemble drawing data streams to obtain geometric primitives, the geometric primitives corresponding to at least one view; the first cache unit is configured to store primitive information of the geometric primitives, the primitive information including the number of primitives, the number of vertices, the number of primitive bunches, and the number of waves; the second cache unit is configured to store vertex information of the geometric primitives, the vertex information includes a vertex position, a vertex attribute, and a vertex normal; the wave construction unit is configured to construct waves according to the primitive information and the vertex information; the EU includes at least one computing unit; the wave management unit is configured to schedule the waves into the computing unit for execution to perform image processing on the geometric primitives, and update the vertex information in the second cache unit according to vertex address information obtained by the image processing; the raster processing unit is configured to rasterize the updated vertex information to obtain a corresponding two-dimensional image, and determine a view corresponding to each pixel point in the two-dimensional image; and the image generation unit is configured to generate a multi-view image according to image colors obtained by the executions of the waves and the view corresponding to each pixel point.

In an embodiment, data is stored in the first cache unit through a two-dimensional table, rows in the two-dimensional table in the first cache unit are configured to represent draw batches of geometric primitives, a first column is configured to represent whether valid data exists in corresponding rows, second column to the fifth column are sequentially configured to represent the number of primitives, the number of vertices, the number of primitive bunches, and the number of waves included in the geometric primitives corresponding to a current draw batch, the sixth column to the last column are sequentially configured to represent output positions of the vertices, and the number of waves is not greater than a product of the number of primitive bunches and the number of views.

In an embodiment, initial positions of all vertices corresponding to each draw batch are identical, the second cache unit is configured to store data through a two-dimensional table, rows in the two-dimensional table in the second cache unit are sequentially configured to represent occupied spaces of vertices in primitive bunches corresponding to views according to the initial positions, and columns are configured to represent vertex information of vertices, the occupied spaces are calculated according to the vertex information of the corresponding vertices and the number of views of the draw batches corresponding to the vertices.

In an embodiment, the wave construction unit is configured to determine views corresponding to the vertices of the geometric primitives, split the vertices to obtain primitive bunches corresponding to the views, and construct waves according to the primitive bunches, each wave is configured to perform the image processing on one primitive bunch.

In an embodiment, the wave construction unit is configured to: expand the primitive bunches to correspond to the views when the number of primitive bunches reaches a preset number or the splitting of the vertices of the geometric primitives is completed, construct a wave for performing the image processing on each primitive bunch, mark the wave with the same view as the corresponding primitive bunch, and mark all waves corresponding to primitive bunches corresponding to each view with the same view name.

In an embodiment, the wave management unit is further configured to request to add a new blank row to the two-dimensional table in the first cache unit, to allow the first cache unit to store the primitive information of the geometric primitives into the blank row.

In an embodiment, the waves include a front-end wave and a back-end wave, the front-end wave is configured to perform front-end shading (FS) on the geometric primitives, the back-end wave is configured to perform back-end shading (BS) on the geometric primitives, the FS includes vertex shading, hull shading, and domain shading, and the BS includes pixel shading.

In an embodiment, the wave management unit is configured to: schedule the waves to the computing unit for execution; perform the image processing on the vertices of the geometric primitives; after all vertices are processed, for each vertex corresponding to each view, calculate an initial position of the vertex in a current view; and generate vertex address information according to initial positions and vertex information of all vertices.

In an embodiment, the image generation unit is configured to generate the multi-view image according to image colors of pixel points obtained by executions of the front-end wave and the back-end wave and views corresponding to the pixel points.

In the second aspect of the present disclosure, a multi-view image generation method is provided, including: assembling drawing data streams to obtain geometric primitives, the geometric primitives corresponding to at least one view, primitive information of the geometric primitives including the number of primitives, the number of vertices, the number of primitive bunches, and the number of waves, vertex information of the geometric primitives including vertex positions, vertex attributes, and vertex normal; constructing waves according to the primitive information and the vertex information; executing the waves to perform image processing on the geometric primitives, and updating the vertex information according to vertex address information obtained by the image processing; rasterizing the updated vertex information to obtain a corresponding two-dimensional image, and determining views corresponding to pixel points in the two-dimensional image; and generating a multi-view image according to image colors obtained by executions of the waves and the views corresponding to the pixel points.

In an embodiment, the primitive information of the geometric primitives is stored in a two-dimensional table, rows in the two-dimensional table are configured to represent draw batches of the geometric primitives, the first column in the two-dimensional table is configured to represent whether valid data exists in the corresponding rows, the second column to the fifth column in the two-dimensional table are sequentially configured to represent the number of primitives, the number of vertices, the number of primitive bunches, and the number of waves included in geometric primitives corresponding to a current draw batch, the sixth column to the last column in the two-dimensional table are sequentially configured to represent output positions of the vertices, and the number of waves is not greater than a product of the number of primitive bunches and the number of views.

In an embodiment, initial positions of all vertices corresponding to each draw batch are identical, the vertex information of the geometric primitives is stored in the two-dimensional table, rows in the two-dimensional table are sequentially configured to represent occupied spaces of vertices in primitive bunches corresponding to the views according to the initial positions, and columns in the two-dimensional table are configured to represent vertex information of the vertices, the occupied spaces are calculated according to the vertex information of the corresponding vertices and the number of views in the draw batches corresponding to the vertices.

In an embodiment, the constructing the waves according to the primitive information and the vertex information includes: determining views corresponding to the vertices of the geometric primitives, splitting the vertices to obtain primitive bunches corresponding to the views, and constructing the waves according to the primitive bunches, each wave is configured to perform the image processing on one primitive bunch.

In an embodiment, the constructing waves according to the primitive bunches includes: expanding the primitive bunches to correspond to the views when the number of primitive bunches reaches a preset number or the splitting of the vertices of the geometric primitives is completed, constructing a wave for the image processing on each primitive bunch, marking the wave with the same view as the corresponding primitive bunch, and marking all waves corresponding to the primitive bunches corresponding to each view with the same view name.

In an embodiment, the method may further include: requesting to add a new blank row to the two-dimensional table, to store the primitive information of the geometric primitives into the blank row.

In an embodiment, the waves includes a front-end wave and a back-end wave, the front-end wave is configured to perform front-end shading (FS) on the geometric primitives, the back-end wave is configured to perform back-end shading (BS) on the geometric primitives, the FS includes vertex shading, hull shading, and domain shading, and the BS includes pixel shading.

In an embodiment, the executing the waves to perform the image processing on the geometric primitives further includes: executing the waves to perform the image processing on the vertices of the geometric primitives, after all vertices are processed, for each vertex corresponding to each view, calculating an initial position of the vertex in a current view, and generating vertex address information according to initial positions and vertex information of all vertices.

In an embodiment, the generating the multi-view image according to the image colors obtained by the executions of the waves and the views corresponding to the pixel points includes: generating the multi-view image according to the image colors of the pixel points obtained by executions of the front-end wave and the back-end wave and the views corresponding to the pixel points.

In the third aspect of the present disclosure, a graphics processing unit (GPU) is provided, including the multi-view image generation apparatus described above.

According to the above-mentioned multi-view image generation apparatus and the GPU, the waves are constructed according to the primitive information and the vertex information of geometric primitives to generate a plurality of waves for parallel processing, and the waves are scheduled by the wave management unit for execution, which can improve the execution efficiency. Since the primitive information of the geometric primitives is stored in the first cache unit, data sharing between the waves can be implemented. Meanwhile, during the parallel processing of the waves, the vertex information in the second cache unit is updated in real time according to the vertex address information outputted by the waves, so that the raster processing unit can read the latest vertex information from the second cache unit. Finally, through the image generation unit, a multi-view image is generated according to the image colors obtained by executions of the waves and views corresponding to the pixel points. Therefore, the data access efficiency can be improved, and the processing performance of the GPU can be guaranteed, thereby improving the image drawing efficiency.

BRIEF DESCRIPTION OF THE DRAWINGS

In order to more clearly describe the technical solution in the embodiments of the present disclosure or in the related technologies, the accompanying drawings required for describing the embodiments or the related technologies will be briefly introduced below. Obviously, the accompanying drawings in the following description merely show some embodiments of the present disclosure. Those of ordinary skill in the art can obtain other drawings based on these accompanying drawings without creative efforts.

FIG. 5 is an application environment diagram of a multi-view image generation method according to an embodiment.

FIG. 6 is a flow chart showing a multi-view image generation method according to an embodiment.

FIG. 8 is a structural block diagram of a multi-view image generation apparatus according to an embodiment.

FIG. 9 is an internal structural diagram of a computer device according to an embodiment.

DETAILED DESCRIPTION

Figures 1, 2:
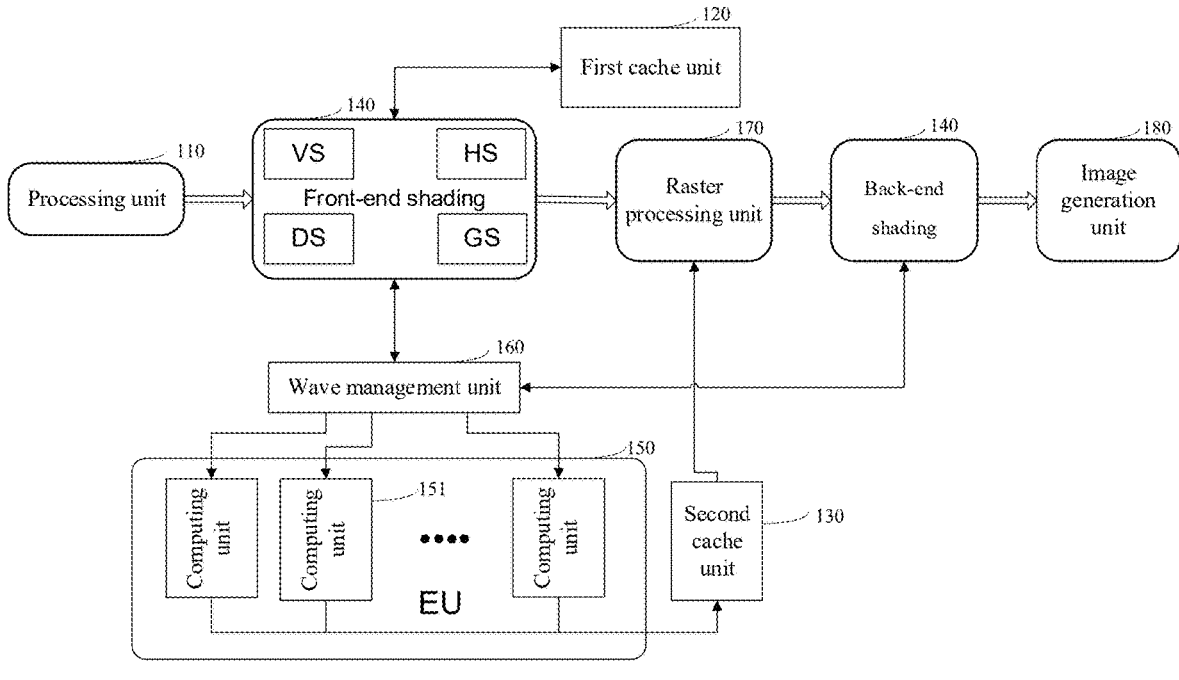
FIG. 1 is a structural block diagram of a multi-view image generation apparatus according to an embodiment.
FIG. 2 is a schematic structural diagram of a two-dimensional table in a first cache unit according to an embodiment.

In order to make the above purpose, technical solution, and advantages of the present disclosure more obvious and understandable, the present disclosure is described in further detail below with reference to the accompanying drawings and embodiments. It should be appreciated that specific embodiments described herein are intended only to explain the present disclosure and are not intended to limit the present disclosure.

In the related technology, for a certain scene, drawing tasks (including the FE and BE) for generating left and right images are the same, except that respective view transformation matrices are different. These matrices are generally calculated before drawing and cached in a memory buffer as constants. A shader program of each view may be invoked through a parameter view_ID, and then a projection position of a geometric primitive on a screen is calculated. Positions on the left and right images may be slightly different, and a parallax effect is produced, so that the user can experience a lifelike three-dimensional scene.

Further, in order to improve the drawing performance, a multi-view concept is proposed, allowing images of multiple view windows to be drawn simultaneously in one pass. One drawing pass is divided into a front end (FE) and a back end (BE). For the FE, a view index view_ID is introduced to distinguish left and right eyes, thereby using different view transformation matrices to perform view transformations; while the BE may determine, through the view_ID, a target image outputted by a pixel shader. Through these extensions, multiple passes from multiple viewpoints can be turned into one pass to complete the drawing of images, which greatly improves the computational efficiency.

However, since a large number of geometric primitives are involved in one draw, in the case of multi-view, each geometric primitive is required to be drawn and calculated multiple times, and only a spatial position varies each time. Since a wave is often organized in the form of simd32 and processes 32 primitives at a time, which may have two disadvantages if multiple views of each primitive are processed circularly before the next primitive is processed as follows: 1. for a front-end wave, a view_ID of each primitive is different, and different view transformation matrices are required to be accessed, resulting in dissatisfied data continuity; 2. for a back-end wave, generation results of these pixels are required to be outputted to target images of different views, resulting in dissatisfied data continuity and lower cache utilization.

Alternatively, if the same view of all primitives is processed before primitives of the next view are processed, since the same primitives of different views are executed at an excessively large time interval, the cache utilization of input data is lower, and the expansion of the view in a shading process may lead to multiple executions, which leads to a waste of resources.

In order to solve the above problem, in an embodiment, as shown in FIG. 1, a multi-view image generation apparatus is provided. Prior to the description of the embodiments of the present disclosure, terms possibly involved in the embodiments of the present disclosure are explained as follows.

Draw batch: each batch is a fixed value, such as 32 or 64, a cyclic view expansion is performed on primitives of the batch, and after completion, a next batch is processed. A batch generally refers to the number of inputted primitives. According to different primitive types, different numbers of vertices needs to be recorded.

Bunch: a bunch is a primitive bunch; One batch may be split into a plurality of bunches, and each bunch is a collection of multiple adjacent geometric primitives.

Shader: a shader is a basic program for performing a specific computing task during graphics rendering.

Wave: a wave is a basic unit configured to perform graphics processing.

Execution Unit (EU): an EU is configured to execute a computing task of a wave.

In conjunction with the above description of the terms, a multi-view image generation apparatus provided in an embodiment of the present disclosure may be applied to, for example, a chip of a Graphics Processing Unit (GPU). Based on the above description, as shown in FIG. 1, the apparatus may include: a processing unit 110, a first cache unit 120, a second cache unit 130, a wave construction unit 140, an EU 150, a wave management unit 160, a raster processing unit 170, and an image generation unit 180.

The processing unit 110 is configured to assemble drawing data streams to obtain geometric primitives; the geometric primitives may correspond to at least one view.

The first cache unit 120 is configured to store primitive information of the geometric primitives. The primitive information may include the number of primitives, the number of vertices, the number of primitive bunches, and the number of waves.

The second cache unit 130 is configured to store vertex information of geometric primitives. The vertex information may include a vertex position, a vertex attribute, and a vertex normal.

The wave construction unit 140 is configured to construct a wave according to the primitive information and the vertex information.

The EU 150 may include at least one computing unit 151.

The wave management unit 160 is configured to schedule the wave into the computing unit 151 for execution to perform image processing on the geometric primitives, and update the vertex information in the second cache unit 130 according to vertex address information obtained by the image processing.

The raster processing unit 170 is configured to rasterize the updated vertex information to obtain a corresponding two-dimensional image, and determine a view corresponding to each pixel point in the two-dimensional image.

The image generation unit 180 is configured to generate a multi-view image according to image colors obtained by the execution of the wave and the view corresponding to each pixel point.

It should be noted that, in FIG. 1, the processing unit 110 is configured to receive drawing data streams of software and assemble the drawing data streams into the geometric primitives; the primitive information is stored in the first cache unit 120 and cached. The wave construction unit 140 is configured to construct waves for front-end shading (FS) and back-end shading (BS) respectively, and transmit the constructed waves to the wave management unit 160. The wave management unit 160 may uniformly schedule various waves, and select an appropriate computing unit 151 from the EU 150 to execute a single-instruction multiple-data (SIMD) instruction. Output data of each wave for the front-end is written into the second cache unit 130 for temporary storage, and is read by a subsequent module as input data. The geometric primitives after the FS are transmitted to the raster processing unit 170, which may read attributes of the vertices, such as positions and colors, from the second cache unit 130 to perform the rasterization operation. In the BS, a wave of a pixel is constructed based on a result of the rasterization operation and is transmitted to the wave management unit 160 for scheduling and execution. The final color is outputted to the image generation unit 180 to perform a post-calculation, such as color mixing and elimination, and is finally outputted to a display screen.

In view of the above, the basic unit of the EU 150 is the wave, which has a SIMD structure and generally binds 32 units together for parallel processing (which may alternatively be 16 or 64 computing units). Herein, the 32 units may be understood as 32 vertices in the geometric primitives, that is, one bunch, and each bunch is correspondingly executed by one wave.

For example, each wave may process 32 vertices at the same time, and every 32 vertices are recorded as one bunch. For example, one batch may include up to 64 primitives and 192 vertices. Since the 192 vertices in one batch may have some of the same, the wave construction unit 140 may pre-detect the identical vertices and ensure that the identical vertices are executed only once by the wave. Accordingly, one batch may have up to 192 vertices, and may produce up to 6 bunches, or merely 1 or 2 bunches.

Since the EU 150 includes a plurality of computing units 151, during the execution, the wave management unit 160 schedules the waves to the computing units 151 for execution. If there exists 6 bunches, the computing units 151 that may be scheduled to be ALU0 to ALU5. The six computing units 151 execute computing tasks of image drawing in parallel, which can improve the execution efficiency.

In the above embodiment, through the multi-view image generation apparatus and the GPU, the waves are constructed according to the primitive information and vertex information of the geometric primitives to generate a plurality of waves for parallel processing, and the waves are scheduled by the wave management unit for execution, which can improve the execution efficiency. Since the primitive information of the geometric primitives is stored in the first cache unit, data sharing between the waves can be implemented. Meanwhile, during the parallel processing of the waves, the vertex information in the second cache unit is updated in real time according to the vertex address information outputted by the waves, so that the raster processing unit can read the latest vertex information from the second cache unit. Finally, through the image generation unit, the multi-view image is generated according to the image color obtained by executions of the waves and the view corresponding to each pixel point. Accordingly, the data access efficiency can be improved, and processing performance of the graphics processor can be guaranteed, thereby improving the image drawing efficiency.

In an exemplary embodiment, as shown in FIG. 2, data is stored in the first cache unit through a two-dimensional table. In the two-dimensional table in the first cache unit, rows are configured to represent draw batches of geometric primitives; a first column is configured to represent whether valid data exists in a corresponding row; second column to the fifth column are sequentially configured to represent the number of primitives, the number of vertices, the number of primitive bunches, and the number of waves included in the geometric primitives corresponding to a current draw batch; the sixth column to the last column are sequentially configured to represent output positions of the vertices; and the number of waves is not greater than a product of the number of primitive bunches and the number of views.

The first cache unit 120 is configured to record output positions (vcid) of vertices in the batch. In consideration of parallel computing of the hardware, information of a plurality of batches generally need to be recorded. As shown in FIG. 2, it shows a basic structure of the two-dimensional table in the first cache unit 120. For example, one batch includes up to 64 primitives and 192 vertices.

Specifically, the first row to the last row 0 to (m−1) represent different batches of the geometric primitives.

Valid indicated by the first column Valid: it indicates whether valid data exists in a corresponding row. Specifically, 1 denotes a recorded valid row, and 0 denotes an invalid blank row.

Prim_Num indicated by the second column: it denotes the number of primitives included in the current batch.

Vtx_Num indicated by the third column: it denotes the number of all vertices of the primitives in the current batch.

Bnh_Num indicated by the fourth column: it denotes the number of bunches split from the current batch.

Wv_Num indicated by the fifth column: it denotes the number of waves to be generated in the current batch, and a maximum value thereof may be equal to (Bnh_Num*View_Num), where View_Num denotes the number of views in the current Multi-view, which is accumulated during the wave construction and is decreased after the execution of the wave is completed. When Wv_Num becomes 0, it indicates that executions of all waves of the batch are completed, and the primitive data thereof may be outputted to the second cache unit 130. The second cache unit 130 may apply a vertex cache (VC).

Vertex_id in VC indicated by the sixth column to the last column (positions in a VC space: vcid0 to vcid191): it denotes position information of the vertices in VC involved in the current batch. The wave outputs the vertex result to the VC, and the vertex result is read by a subsequent module for input to the wave. The effective number of vertices is recorded in Vtx_Num.

In the embodiment, the information management of the draw batches is performed by adding the first cache unit, in order to facilitate the data access by subsequent modules and improve the data access efficiency.

Figure 3:
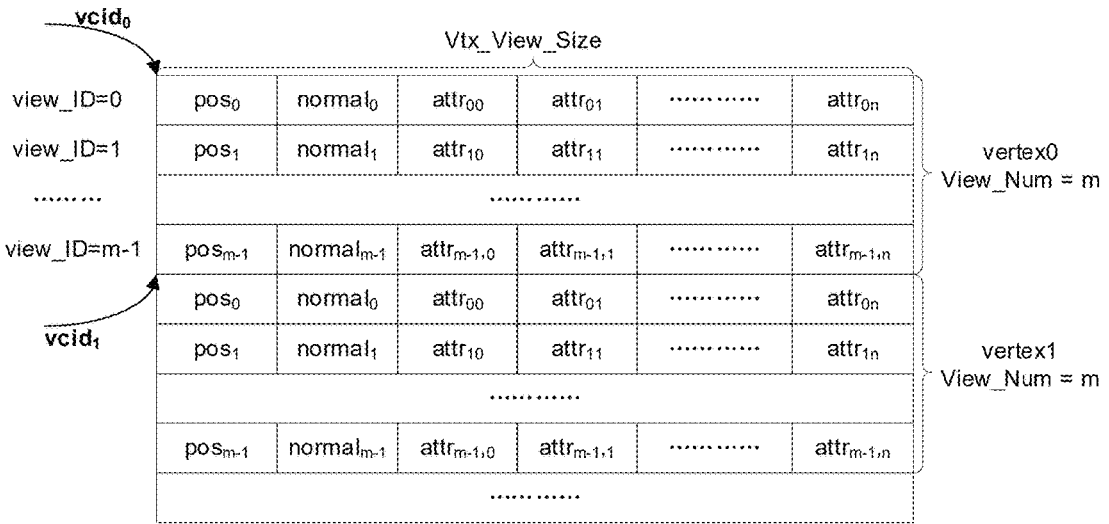
FIG. 3 is a schematic structural diagram of a two-dimensional table in a second cache unit according to an embodiment.

In an exemplary embodiment, as shown in FIG. 3, initial positions of all vertices corresponding to each draw batch are identical. The second cache unit stores data through the two-dimensional table. In the two-dimensional table of the second cache unit, rows are sequentially configured to represent occupied spaces of vertices in primitive bunches corresponding to views according to the initial positions, and columns are configured to represent vertex information of vertices. The occupied spaces are calculated according to the vertex information of the corresponding vertices and the number of views of the draw batches corresponding to the vertices.

The second cache unit is configured to record output information of the wave, that is, an allocated space of the vertex in the VC, including positions, attributes, normals, and other data of multiple views, and an initial position of the allocated space is recorded as vcid. The rows in the two-dimensional table in the second cache unit are sequentially configured to represent occupied spaces (i.e., Vtx_View_Size) of vertices in primitive bunches corresponding to the views according to the initial positions. The columns in the two-dimensional table in the second cache unit are configured to represent vertex information of the vertices. view_ID=0, view_ID=1, . . . , and view_ID=m−1 are sorted in an ascending order of view numbers until all vertices at current initial positions are written (that is, all vertices vertex0 corresponding to the current initial positions); $vcid_0$, $vcid_1$, . . . are stored in an ascending order of the initial positions of the vertices in the VC space, until the vertices of all views (i.e., View_Num=m) at the current initial positions $vcid_0$ are written (i.e., all vertices vertex0 corresponding to the current initial positions).

Specifically, assuming that a size of a total space required to be occupied by a position, a normal, and attributes of each vertex is denoted as Vtx_View_Size, and the current Multiview has a total of View_Num views (View_Num=m), the size of the total space required to be occupied by one vertex is equal to Vtx_View_Size*View_Num.

For example, an initial address of each vertex is vcid, and a data placement order thereof is to place, according to different views, data of view0, then data of view1, and so on: pos0, normal0, attr00, attr01, . . . , attr0n; pos1, normal1, attr10, attr11, . . . , attr1n; . . . ; posm-1, normalm-1, attrm-1,0, attrm-1,1, . . . , attrm-1,n. The VC space of the vertex may be shared by outputs of multiple views. The initial address of each view is denoted as vcid+ (view_ID*Vtx_View_Size).

In the embodiment, the output information of the waves is stored by adding the second cache unit, in order to facilitate the data reading by subsequent modules and improve the data access efficiency.

Figure 4:
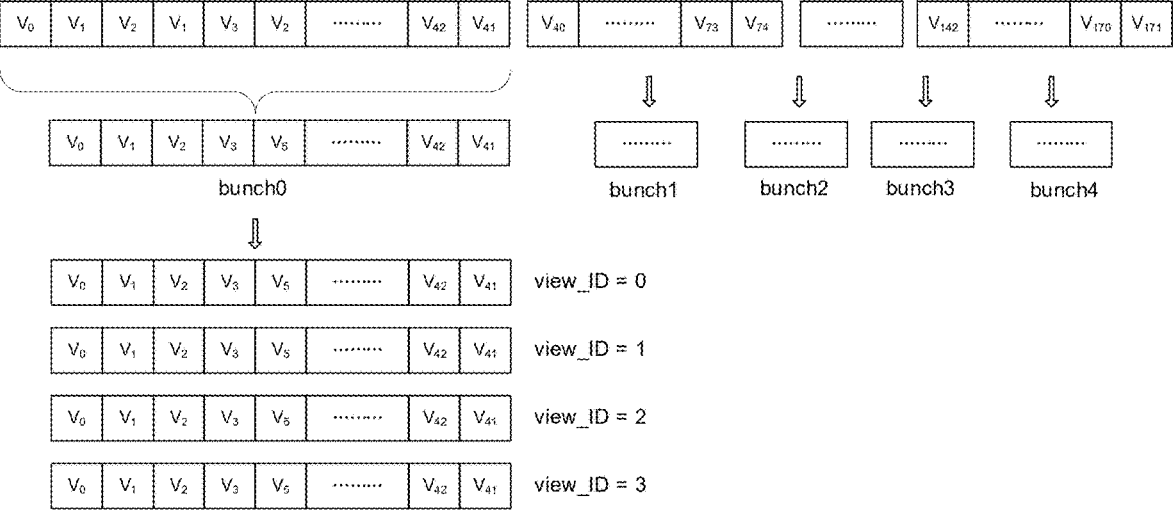
FIG. 4 is a schematic structural diagram of primitive bunches obtained by splitting according to an embodiment.

In an exemplary embodiment, as shown in FIG. 4, the wave construction unit is specifically configured to: determine views corresponding to the vertices of the geometric primitives; split the vertices to obtain primitive bunches corresponding to views; and construct waves according to the primitive bunches. Each wave is configured to perform image processing on one of the primitive bunches.

In view of the above, if the same view corresponding to all primitives is processed first and then primitives corresponding to next view are processed, the cache utilization of the input data and the execution efficiency are lower. By splitting the vertices, one batch is split into a plurality of batches corresponding to different views for parallel processing, so that the processing efficiency is improved.

The splitting of batches corresponding to views is generally completed at the shading phase. As shown in FIG. 4, it is assumed one batch includes 64 triangle strips or triangle lists, with a total of 172 vertices, denoted respectively as $V_0$, $V_1$, . . . , and $V_{171}$, some of which are identical vertices. After the wave construction unit determines the identical vertices, 32 vertices are determined as one group and the batch is split into 5 bunches, denoted respectively as bunch0, bunch1, bundle2, bunch3, and bunch4. Each bunch corresponds to a wave for 4 views with view_IDs set to 0, 1, 2, and 3 respectively.

It should be noted that, for a bunch at a tail portion of one batch, the number of remaining vertices may not be exactly 32, which easily causes that one wave with the simd32 structure is executed without being full, thereby wasting the utilization of ALU. For example, the number of primitives is 64, and the number of vertices in the current batch is only 80, which may construct up to 3 bunches each of which has 32 vertices. The first two bunches are full of 32 vertices, but the third bunch only has 16 vertices. In order to prevent the waste of resources, part of the vertices of a following batch may continuously be included to fill up the bunch for the current wave.

In the embodiment, by splitting the current batch into a plurality of primitive bunches according to the vertices, the primitive bunches can be processed in parallel through a plurality of waves, which can improve the image processing efficiency.

In an exemplary embodiment, the wave construction unit is specifically configured to: expand the primitive bunches to correspond to the views when the number of primitive bunches reaches a preset number or the splitting of the vertices of the geometric primitives is completed, construct the wave for performing the image processing on each primitive bunch, mark the wave with the same view as the corresponding primitive bunch, and mark all waves corresponding to the primitive bunches corresponding to each view with the same view name.

When the number of primitive bunches reaches the preset number or the splitting of the vertices of the geometric primitives is completed, it is determined that all geometric primitives in the current draw batch are split and then expanded to correspond to the views according to the number of views. As shown in FIG. 4, one batch includes 64 triangle strips or triangle lists, with a total of 172 vertices, and 32 vertices are determined as one group and the batch is split into 5 bunches. Each bunch corresponds to a wave for 4 views with view_IDs set to 0, 1, 2, and 3 respectively.

For each primitive bunch, a wave for performing the image processing on the primitive bunch is constructed. Generally, each wave is configured to process one primitive bunch corresponding to one view. The waves of all primitive bunches corresponding to the same view are marked with the current view, so that data access between the waves corresponding to the same view can be implemented.

In the embodiment, all waves corresponding to the primitive bunches corresponding to each view are marked with the same view name, accordingly the data sharing between waves corresponding to the same view mame can be ensured, thereby improving the data access efficiency.

In an exemplary embodiment, still as shown in FIG. 3, the wave management unit is further configured to request to add a new blank row to the two-dimensional table in the first cache unit, to allow the first cache unit to store the primitive information of the geometric primitives into the blank row.

The first cache unit is configured to store the primitive information of the geometric primitives. When the wave construction unit performs the vertex splitting, the primitive information in the first cache unit is directly accessed, which improves the access efficiency. Specifically, before the splitting, the wave management unit requests to add one blank row to the two-dimensional table in the first cache unit, records primitive information of the current batch, after receiving the geometric primitives, allocates spatial positions vcid of vertices of the VC space corresponding to the geometric primitives, and records the spatial positions into the blank row.

It should be noted that a plurality of triangles may share multiple identical vertices. In this case, a hit/miss detection mechanism may be utilized to detect an identity, to allow the identical vertices to use the same vcid, which can greatly reduce the number of vertices in the calculation. For example, for an inputted vertex sequence of 9 vertices, namely v0, v1, v2, v2, v1, v3, v1, v3, v4, only 5 VC spaces need to be allocated, i.e., vcid0 to vicd4; and a sequence recorded into a batch information row becomes: vcid0, vcid1, vcid2, vcid1, vcid3, vcid1, vcid3, vcid4.

In the embodiment, the first cache unit is added to perform the information management of the draw batches, which facilitates the data access by subsequent modules and improve the data access efficiency.

In an exemplary embodiment, still as shown in FIG. 1, the wave may include a front-end wave and a back-end wave. The front-end wave is configured to perform front-end shading (FS) on the geometric primitives, and the back-end wave is configured to perform back-end shading (BS) on the geometric primitives. The FS includes vertex shading, hull shading, and domain shading; and the BS includes pixel shading.

Shaders configured for the front-end wave and the back-end wave may include a front-end shader and a back-end shader. The front-end shader mainly includes a vertex shader (VS), a hull shader (HS), a domain shader (DS), and a geometry shader (GS), which are mainly configured to process geometric topological information of points, lines, and triangles, including position of vertices, normal vectors of vertices, basic colors, texture coordinates, and the like. In a certain phase of the front-end shader, the view_ID needs to be utilized to obtain a current view transformation matrix and perform a projection transformation. The back-end shader mainly includes a pixel shader (PS), which mainly performs shading calculation on pixels formed by projecting the geometric primitives onto the screen to obtain final colors. When the colors are outputted, a target image needs to be determined according to the view_ID to which the primitives correspond.

In the embodiment, by constructing the front-end shading and the back-end shading, different shading phases are divided, which can improve the flexibility of the waves. Moreover, the front-end wave and the back-end wave are uniformly scheduled by the wave management unit for parallel processing, thereby improving the image processing efficiency.

In an exemplary embodiment, the wave management unit is specifically configured to schedule the waves to the computing unit for execution, and perform the image processing on the vertices of the geometric primitives; after all vertices are processed, for each vertex corresponding to each view, an initial position of the vertex in a current view is calculated; and vertex address information is generated according to initial positions and vertex information of all vertices.

The wave management unit 160 is configured to allocate an execution unit (EU) and schedule waves to the EU to perform a parallel processing. The scheduled wave is the front-end wave, and the projection transformation is performed through the front-end wave. An outputted result of the execution is written to the vertex space which the vcid directs to. After all waves corresponding to the current batch are executed, all primitive information of the batch may be outputted. The wave may perform a cyclic output on a plurality of views and read vertex positions, attributes, and other data corresponding to the current view from the VC. Meanwhile, for each view, an actual position of each vertex in the VC needs to be calculated. An initial address of the current view is denoted as vcid+(view_ID*Vtx_View_Size). The vertex information is combined to obtain vertex address information which is stored in the second cache unit.

In the embodiment, the initial positions of the vertices corresponding to the current view are calculated, and the vertex address information is obtained through combination and stored in the second cache unit, which facilitates data reading by subsequent modules and improves data access efficiency.

In an exemplary embodiment, the image generation unit is specifically configured to generate a multi-view image according to image colors of pixel points obtained by executions of the front-end wave and the back-end wave and views corresponding to the pixel points.

In the phase of invoking the back-end wave to perform the back-end shading, the current view_ID is recorded onto each geometric primitive and rasterized by the raster processing unit 170, to obtain that each pixel point also has corresponding view_ID information. The image generation unit calculates and obtains an output color of each pixel point, and selects, according to the view_ID information of each pixel point, a corresponding drawn target image to store the output color to generate the multi-view image.

In the embodiment, the image generation unit calculates the output color of each pixel point, and since the pixel point has the corresponding view information, a specified view image may be generated according to the image color and the view information corresponding to the pixel point, which can improve the image drawing efficiency.

In an exemplary embodiment of the present disclosure, a multi-view image generation method is further provided, which may be applied to a computer device including a GPU as shown in FIG. 5. In the computer device, the GPU is the second most important chip after the CPU, which is not only configured to display and draw, but also configured to perform general computing, deep reasoning, and other functions. The GPU the CPU, a cache unit, a display device, an input/output unit, etc., form a basic computer device. It should be appreciated that the computer device may specifically be a terminal or a server. The terminal may include, but is not limited to, various personal computers, laptops, smartphones, tablets, Internet of Things devices, and portable wearable devices. The Internet of Things devices may be smart speakers, smart TVs, smart air conditioners, smart medical facilities, and the like. The portable wearable devices may be smart watches, smart bracelets, head-mounted devices, and the like. The server may be implemented by a standalone server or a server cluster formed by multiple servers.

In an exemplary embodiment, as shown in FIG. 6, a multi-view image generation method is provided, the method is applied to the GPU shown in FIG. 5 as an example for illustration. The method may include the following steps.

In step 602, drawing data streams are assembled to obtain geometric primitives; the geometric primitives correspond to at least one view; primitive information of the geometric primitives includes the number of primitives, the number of vertices, the number of primitive bunches, and the number of waves; and vertex information of the geometric primitives includes vertex positions, vertex attributes, and vertex normal vectors.

The drawing data streams refer to drawing data that the GPU receives from software when drawing. The drawing data of each draw batch is formed by a large number of geometric primitives, generally including points, lines, and triangles. In view of the above, the primitive information of the geometric primitives may be stored by the first cache unit, the vertex information may be stored by the second cache unit. When constructing a wave, the GPU accesses the primitive and vertex information in the first and second cache unit to split and expand the geometric primitives and construct a plurality of waves to perform parallel processing.

In step 604, waves are constructed according to the primitive information and the vertex information.

The waves include a front-end wave and a back-end wave. Generally, one wave may include 32 units (alternatively, may be 16 or 64 computing units). Herein, the 32 units may be understood as 32 vertices in the geometric primitives, that is, a primitive bunch obtained by splitting the vertices of the geometric primitives. Each primitive bunch is processed by one wave.

In step 606, the waves are executed to perform image processing on the geometric primitives, and the vertex information is updated according to vertex address information obtained by the image processing.

During the execution, the GPU invokes a plurality of waves to perform the parallel processing to process generated images of multiple views at once. Output data of the waves is address information of the vertices in the VC space, the vertex information is updated according to the address information, the address information is stored in the second cache unit, and in subsequent color calculation, data in the second cache unit is directly invoked. In this case, the waves can execute next batch of draw tasks, thereby improving processing efficiency of the waves.

In step 608, the updated vertex information is rasterized to obtain a corresponding two-dimensional image, and views corresponding to pixel points in the two-dimensional image are determined.

The GPU rasterizes the updated vertex information, and converts a three-dimensional graphic into a two-dimensional image, that is, maps vertices of a geometric graphic to pixel points on a screen. Each pixel point carries corresponding view information.

In step 610, a multi-view image is generated according to image colors obtained by executions of the waves and the views corresponding to the pixel points.

The image color is obtained through the back-end wave. The back-end wave performs a color calculation on each pixel point, draws a target image corresponding to a view according to view information of each pixel point, and generate a multi-view image at once.

In the embodiment, the wave is constructed according to the primitive information and vertex information of the geometric primitives to generate a plurality of waves to perform the parallel processing, which can improve execution efficiency. Since the primitive information of the geometric primitives is stored in the first cache unit, data sharing between the waves can be implemented. Meanwhile, during the parallel processing of the waves, the vertex information in the second cache unit is updated in real time according to the vertex address information outputted by the waves, so that the latest vertex information can be read from the second cache unit. Finally, the multi-view image is generated according to the image colors obtained by executions of the waves and the views corresponding to the pixel points. Therefore, data access efficiency can be improved, and processing performance of the GPU can be ensured, thereby improving the image drawing efficiency.

In an exemplary embodiment, the primitive information of the geometric primitives is stored in a two-dimensional table. In the two-dimensional table, rows are configured to represent draw batches of the geometric primitives; the first column is configured to represent whether valid data exists in the corresponding rows; the second column to the fifth column are sequentially configured to represent the number of primitives, the number of vertices, the number of primitive bunches, and the number of waves included in geometric primitives corresponding to a current draw batch; the sixth column to the last column are sequentially configured to represent output positions of the vertices; and the number of waves is not greater than a product of the number of primitive bunches and the number of views.

The front-end phase of a graphics pipeline is mainly responsible for calculation such as position transformation of primitive vertices, and different views in multiple views need to be processed separately, while the back-end wave may output pixel colors to output images corresponding to different views. In order to support Multi-view, a primitive cache two-dimensional table needs to be constructed to record output positions (vcid) of vertices of primitives in each batch in the VC.

In the two-dimensional table, the rows are configured to represent draw batches of the geometric primitives; the first column is configured to represent whether valid data (0 or 1) exists in the corresponding rows; the second column to the fifth column are sequentially configured to represent primitive information of a current batch; and the sixth column to the last column are sequentially configured to represent vcid of vertices. When the GPU invokes the waves for processing, the void serves as input data of the waves. Since one wave corresponds to one primitive bunch under one view, a total number of waves is generally equal to a product of the number of primitive bunches and the number of views. In other cases, the number of waves may be reduced due to hardware resource constraints. Accordingly, a maximum value of the number of waves is not greater than the product of the number of primitive bunches and the number of views.

In the embodiment, the information management of the draw batches is performed by adding the two-dimensional table, in order to facilitate the data access by subsequent modules and improve the data access efficiency.

In an exemplary embodiment, the initial positions of all vertices corresponding to each draw batch are identical. The vertex information of the geometric primitives is stored in the two-dimensional table. In the two-dimensional table, rows are sequentially configured to represent occupied spaces of vertices in primitive bunches corresponding to the views according to the initial positions; and columns are configured to represent vertex information of the vertices. The occupied spaces are calculated according to the vertex information of the corresponding vertices and the number of views in the draw batches corresponding to the vertices.

The rows in the two-dimensional table are sequentially configured to represent occupied spaces of the vertices in the primitive bunches corresponding to the views obtained by executions of the waves according to the initial positions. The vertex information may include positions, attributes, and normal vectors in the views. For example, assuming that a size of a total space occupied by a position, a normal, and attributes of each vertex is denoted as Vtx_View_Size, and the current Multi-view has a total of View_Num views (View_Num=m), the size of the total space occupied by one vertex is equal to Vtx_View_Size*View_Num.

In the embodiment, the output information of the waves is stored by adding the two-dimensional table, in order to facilitate the data reading by subsequent modules and improve the data access efficiency.

In an exemplary embodiment, the step of constructing the waves according to the primitive information and the vertex information may include: views corresponding to the vertices of the geometric primitives are determined; the vertices are split to obtain primitive bunches corresponding to the views; and the waves are constructed according to the primitive bunches. Each wave is configured to perform image processing on one primitive bunch.

The GPU detects identical vertices to ensure that each vertex is executed only once, and then splits the vertices in groups of 32 (or 64 or the like) vertices to obtain at least one primitive bunch. Each primitive bunch corresponds to one wave. For example, the current draw batch includes 64 triangle strips or triangle lists, with a total of 172 vertices. Some of the vertices are identical. After the determination of the identical vertices, the batch is split into 5 primitive bunches in groups of 32 vertices.

In the embodiment, by splitting the vertices in the current batch into multiple primitive bunches, the primitive bunches can be processed in parallel through multiple waves, which can improve image processing efficiency.

In an exemplary embodiment, the step of constructing waves according to the primitive bunches may include: the primitive bunches are expanded to correspond to the views when the number of primitive bunches reaches a preset number or the splitting of the vertices of the geometric primitives is completed; for each primitive bunch, a wave for image processing on the primitive bunch is constructed, and the wave is marked with the same view as the corresponding primitive bunch; all waves corresponding to the primitive bunches corresponding to each view are marked with the same view name.

When the number of primitive bunches reaches the preset number or the splitting of the vertices of the geometric primitives is completed, it is determined that all geometric primitives in the current draw batch are split and then expanded into primitive bunches corresponding to the views according to the number of views. The wave corresponding to each primitive bunch is marked as the corresponding view.

For each primitive bunch, the wave for image processing on the primitive bunch is constructed. Generally, each wave is configured to process one primitive bunch corresponding to one view, and the waves of all primitive bunches corresponding to the same view are marked with a current view, so that data access between the waves corresponding to the same view can be implemented.

In the embodiment, all waves corresponding to the primitive bunches corresponding to each view are marked with the same view name, accordingly the data sharing between waves corresponding to the same view mame can be ensured, thereby improving the data access efficiency.

In an exemplary embodiment, the method may further include: it is requested to add a new blank row to the two-dimensional table, to store the primitive information of the geometric primitives into the blank row.

The two-dimensional table is configured to store the primitive information of the geometric primitives. During the splitting of vertices, the primitive information in the two-dimensional table may be directly accessed, which improves the access efficiency. Specifically, before the splitting, it is requested to add one blank row to the two-dimensional table, the primitive information of the current batch is recorded, after receiving the geometric primitives, spatial positions of vertices corresponding to the geometric primitives are allocated, and the spatial positions are recorded into the blank row.

In this embodiment, the first cache unit is added to perform the information management of the draw batches, in order to facilitate the data access by subsequent modules and improve the data access efficiency.

In an exemplary embodiment, the wave may include a front-end wave and a back-end wave. The front-end wave is configured to perform front-end shading (FS) on the geometric primitives, and the back-end wave is configured to perform back-end shading (BS) on the geometric primitives. The FS includes vertex shading, hull shading, and domain shading; and the BS includes pixel shading.

Shaders configured for the front-end wave and the back-end wave may include a front-end shader and a back-end shader. The front-end shader mainly includes a vertex shader (VS), a hull shader (HS), a domain shader (DS), and a geometry shader (GS), which are mainly configured to process geometric topological information of points, lines, and triangles, including position of vertices, normal vectors of vertices, basic colors, texture coordinates, and the like. In a certain phase of the front-end shader, the view_ID needs to be utilized to obtain a current view transformation matrix and perform a projection transformation. The back-end shader mainly includes a pixel shader (PS), which mainly performs shading calculation on pixels formed by projecting the geometric primitives onto the screen to obtain final colors. When the colors are outputted, a target image needs to be determined according to the view_ID to which the primitives correspond.

In the embodiment, by constructing the front-end shading and the back-end shading, different shading phases are divided, which can improve the flexibility of the waves. Moreover, the front-end wave and the back-end wave are uniformly scheduled by the wave management unit for parallel processing, thereby improving the image processing efficiency.

In an exemplary embodiment, the step of executing the waves to perform image processing on the geometric primitives may further include: waves are executed to perform the image processing on the vertices of the geometric primitives; after all vertices are processed, for each vertex corresponding to each view, an initial position of the vertex in a current view is calculated; and vertex address information is generated according to initial positions and vertex information of all vertices.

The GPU executes the waves in parallel to perform the image processing on the vertices of the geometric primitives. The scheduled wave is the front-end wave, and projection transformation is performed through the front-end wave. A result outputted by execution of the front-end wave is written into the vertex space. After all the waves corresponding to the current draw batch are executed, the waves read the primitive information and the vertex information of the geometric primitives in each view, calculates initial positions of the vertices in the current view, and generates the vertex address information according to the initial positions and the vertex information of all vertices in the current view. The vertex address information is stored in the two-dimensional table of the second cache unit.

In the embodiment, the initial positions of the vertices in the current view are calculated, the vertex address information is generated and stored in the two-dimensional table, which facilitates the data reading by subsequent modules and improves the data access efficiency.

In an exemplary embodiment, the step of generating the multi-view image according to the image colors obtained by executions of the waves and the views corresponding to the pixel points may include: the multi-view image is generated according to the image colors of the pixel points obtained by executions of the front-end wave and the back-end wave and the views corresponding to the pixel points.

In the phase of invoking the back-end wave to perform the back-end shading, the current view information is recorded onto each geometric primitive and is rasterized to obtain that each pixel point also has corresponding view information. An output color of each pixel point is calculated, and a corresponding drawn target image is selected and stored according to the view information of each pixel point, to generate the multi-view image.

In the embodiment, the output color of each pixel point is calculated, and since the pixel point has the corresponding view information, a specified view image may be generated according to the image color and the view information corresponding to the pixel point, which can improve the image drawing efficiency.

Figure 7:
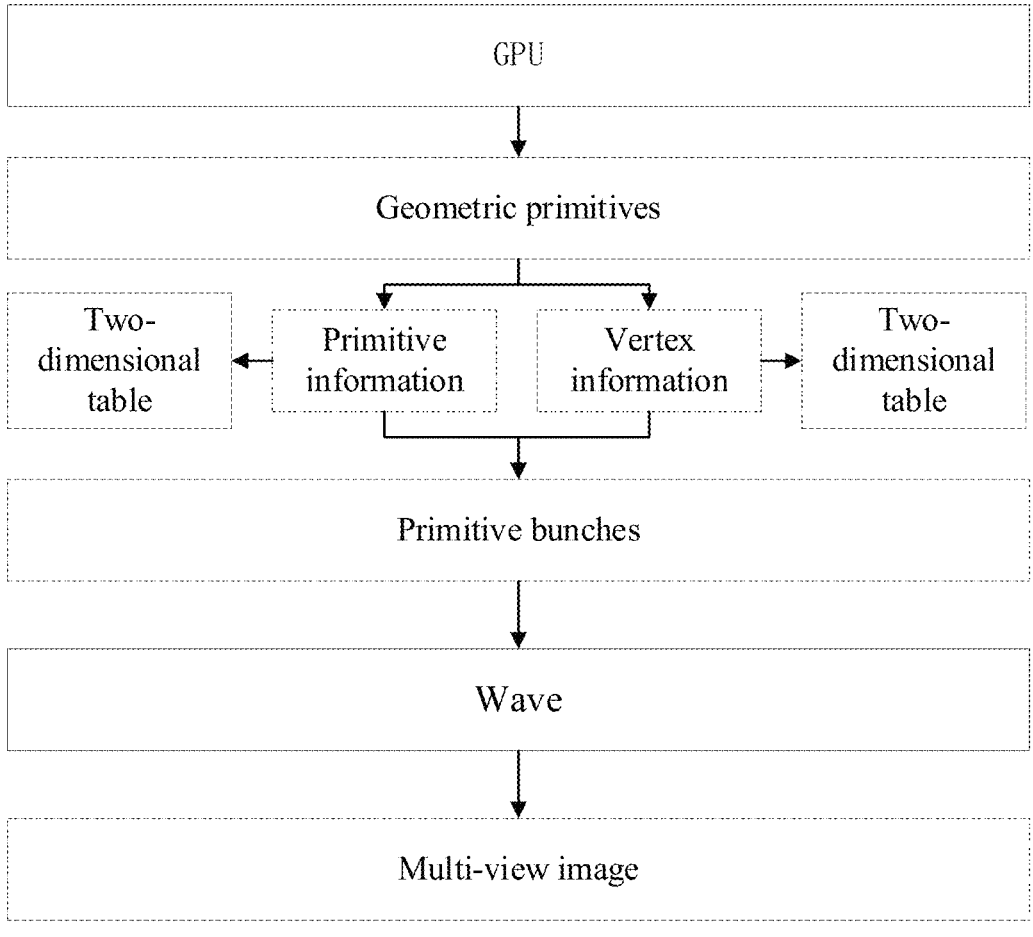
FIG. 7 is a flow chart showing a multi-view image generation method according to an embodiment.

In an exemplary embodiment, as shown in FIG. 7, a multi-view image generation method is provided, and the method may include the following steps.

Drawing data streams are assembled to obtain geometric primitives; the geometric primitives correspond to at least one view; primitive information of the geometric primitives includes the number of primitives, the number of vertices, the number of primitive bunches, and the number of waves; and vertex information of the geometric primitives includes vertex positions, vertex attributes, and vertex normal vectors.

It is requested to add a new blank row to the two-dimensional table, to store the primitive information of the geometric primitives into the blank row.

The the primitive information of the geometric primitives is stored in the two-dimensional table. In the two-dimensional table, rows are configured to represent draw batches of the geometric primitives; the first column is configured to represent whether valid data exists in the corresponding rows; the second column to the fifth column are sequentially configured to represent the number of primitives, the number of vertices, the number of primitive bunches, and the number of waves included in geometric primitives corresponding to a current draw batch; the sixth column to the last column are sequentially configured to represent output positions of the vertices; and the number of waves is not greater than a product of the number of primitive bunches and the number of views.

The initial positions of all vertices corresponding to each draw batch are identical. The vertex information of the geometric primitives is stored in the two-dimensional table. In the two-dimensional table, the rows are sequentially configured to represent occupied spaces of vertices in the primitive bunches corresponding to the views according to the initial positions; and columns are configured to represent vertex information of the vertices. The occupied spaces are calculated according to the vertex information of the corresponding vertices and the number of views in the draw batches corresponding to the vertices.

Views corresponding to the vertices of the geometric primitives are determined; the vertices are split to obtain primitive bunches corresponding to the views; the primitive bunches are expanded to correspond to the views when the number of primitive bunches reaches a preset number or the splitting of the vertices of the geometric primitives is completed; for each primitive bunch, a wave for image processing on the primitive bunch is constructed, and the wave is marked with the same view as the corresponding primitive bunch; each wave is configured to perform the image processing on one primitive bunch; all waves corresponding to the primitive bunches corresponding to each view are marked with the same view name.

The wave may include a front-end wave and a back-end wave. The front-end wave is configured to perform front-end shading (FS) on the geometric primitives, and the back-end wave is configured to perform back-end shading (BS) on the geometric primitives. The FS includes vertex shading, hull shading, and domain shading; and the BS includes pixel shading.

The waves are executed to perform the image processing on the vertices of the geometric primitives; after all vertices are processed, for each vertex corresponding to each view, an initial position of the vertex in a current view is calculated; and vertex address information is generated according to initial positions and vertex information of all vertices.

The updated vertex information is rasterized to obtain a corresponding two-dimensional image, and views corresponding to pixel points in the two-dimensional image are determined.

The multi-view image is generated according to image colors of pixel points obtained by executions of the front-end wave and the back-end wave and views corresponding to the pixel points.

In the embodiment, the waves are constructed according to the primitive information and vertex information of the geometric primitives to generate a plurality of waves for parallel processing, which can improve the execution efficiency. Since the primitive information of the geometric primitives is stored in the first cache unit, data sharing between the waves can be implemented. Meanwhile, during the parallel processing of the waves, the vertex information in the second cache unit is updated in real time according to the vertex address information outputted by the waves, so that the the latest vertex information can be read from the second cache unit. Finally, the multi-view image is generated according to the image color obtained by executions of the waves and the view corresponding to each pixel point. Accordingly, the data access efficiency can be improved, and processing performance of the graphics processor can be guaranteed, thereby improving the image drawing efficiency.

It should be understood that, although the steps in the flow charts involved in the embodiments as described above are displayed in sequence as indicated by the arrows, the steps are not definitely performed in the order indicated by the arrows. Unless otherwise clearly specified herein, the steps are performed without any strict sequence limitation, and may be performed in other orders. In addition, at least part of the steps in the flow charts involved in the embodiments as described above may include multiple steps or multiple stages. These steps or stages are not definitely performed at the same moment, but may be performed at different moments. These steps or stages may not be definitely performed in sequence, but may be performed in turns or alternately with other steps or at least part of the steps or stages of other steps.

Based on a same inventive concept, in an embodiment of the present disclosure, a multi-view image generation apparatus for implementing the above-mentioned multi-view image generation method is provided. An implementation solution provided by the apparatus to solve the problem is similar to the implementation solution described in the above method. Therefore, as for the specific limitations in one or more embodiments of the multi-view image generation apparatus provided below, reference can be made to the limitations on the above-mentioned multi-view image generation method, and the details are not described herein again.

In an exemplary embodiment, as shown in FIG. 8, a multi-view image generation apparatus is provided, including: a primitive assembly module 10, a wave construction module 20, an image processing module 30, a raster processing module 40, and an image generation module 50.

The primitive assembly module 10 is configured to assemble drawing data streams to obtain geometric primitives. The geometric primitives correspond to at least one view; primitive information of the geometric primitives includes the number of primitives, the number of vertices, the number of primitive bunches, and the number of waves; and vertex information of the geometric primitives includes vertex positions, vertex attributes, and vertex normal vectors.

The wave construction module 20 is configured to construct waves according to the primitive information and the vertex information.

The image processing module 30 is configured to execute the waves to perform image processing on the geometric primitives, and update the vertex information according to vertex address information obtained by the image processing.

The raster processing module 40 is configured to rasterize the updated vertex information to obtain a corresponding two-dimensional image, and determine views corresponding to pixel points in the two-dimensional image.

The image generation module 50 is configured to generate a multi-view image according to image colors obtained by executions of the waves and the views corresponding to the pixel points.

In an exemplary embodiment, the geometric primitives involved in the primitive assembly module 10 correspond to at least one view. All waves corresponding to primitive bunches corresponding to each view are marked with the same view name.

In an exemplary embodiment, the primitive information of the geometric primitives involved in the primitive assembly module 10 is stored in a two-dimensional table. In the two-dimensional table, rows are configured to represent draw batches of the geometric primitives; the first column is configured to represent whether valid data exists in the corresponding rows; the second column to the fifth column are sequentially configured to represent the number of primitives, the number of vertices, the number of primitive bunches, and the number of waves included in geometric primitives corresponding to a current draw batch; the sixth column to the last column are sequentially configured to represent output positions of the vertices; and the number of waves is not greater than a product of the number of primitive bunches and the number of views.

In an exemplary embodiment, initial positions of all vertices corresponding to each draw batch are identical. The vertex information of the geometric primitives involved in the primitive assembly module 10 is stored in the two-dimensional table. In the two-dimensional table, the rows are sequentially configured to represent occupied spaces of vertices in the primitive bunches corresponding to the views according to the initial positions; and columns are configured to represent vertex information of the vertices. The occupied spaces are calculated according to the vertex information of the corresponding vertices and the number of views in the draw batches corresponding to the vertices.

In an exemplary embodiment, the wave construction module 20 is further configured to determine the views corresponding to the vertices of the geometric primitives, split the vertices to obtain distinct primitive bunches corresponding to the views, and construct waves according to the primitive bunches. Each wave is configured to perform image processing on one primitive bunch.

In an exemplary embodiment, the wave construction module 20 is further configured to: expand the primitive bunches to correspond to the views when the number of primitive bunches reaches a preset number or the splitting of the vertices of the geometric primitives is completed; construct a wave for image processing on the primitive bunch for each primitive bunch; mark the wave with the same view as the corresponding primitive bunch; and mark all waves corresponding to the primitive bunches corresponding to each view with the same view name.

In an exemplary embodiment, the wave construction module 20 is further configured to request to add a new blank row to the two-dimensional table, to store the primitive information of the geometric primitives into the blank row.

In an exemplary embodiment, the waves involved in the wave construction module 20 include a front-end wave and a back-end wave. The front-end wave is configured to perform front-end shading (FS) on the geometric primitives, and the back-end wave is configured to perform back-end shading (BS) on the geometric primitives. The FS includes vertex shading, hull shading, and domain shading; and the BS includes pixel shading.

In an exemplary embodiment, the image processing module 30 is further configured to: execute the waves to perform the image processing on the vertices of the geometric primitives; after all vertices are processed, for each vertex corresponding to each view, calculate an initial position of the vertex in a current view; and generate vertex address information according to initial positions and vertex information of all vertices.

In an exemplary embodiment, the image generation module 50 is further configured to generate a multi-view image according to image colors of pixel points obtained by executions of the front-end wave and the back-end wave and the views corresponding to the pixel points.

The modules in the above multi-view image generation apparatus may be wholly or partially implemented by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an exemplary embodiment, a computer device is provided. The computer device may be a terminal, and an internal structure diagram thereof may be as shown in FIG. 9. The computer device may include a processor, a memory, an input/output interface, a communication interface, a display unit, and an input device. The processor, the memory, and the input/output interface are connected to each other through a system bus. The communication interface, the display unit, and the input device are connected to the system bus through the input/output interface. The processor of the computer device is configured to provide computing and control capabilities. The memory of the computer device may include a non-transitory storage medium and an internal storage. The non-transitory storage medium stores an operating system and a computer program. The internal storage provides an environment for running of the operating system and the computer program in the non-transitory storage medium. The input/output interface of the computer device is configured to exchange information between the processor and an external device. The communication interface of the computer device is configured to communicate with an external terminal in a wired or wireless manner. The wireless manner may be implemented through WIFI, a mobile cellular network, near field communication (NFC), or other technologies. The computer program is executed by the processor to implement a multi-view image generation method. The display unit of the computer device is configured to form a visually visible picture, which may be a display screen, a projection device, or a virtual reality imaging device. The display screen may be a liquid crystal display screen or an electronic ink display screen. The input device of the computer device may be a touch layer covering the display screen, or may be a key, a trackball, or a touch pad disposed on a housing of the computer device, or may be an external keyboard, a touch pad, a mouse, or the like.

Those skilled in the art may understand that, the structure shown in FIG. 9 only shows a block diagram of a partial structure related to the solution of the present disclosure, which does not constitute a limitation on the computer device to which the solution of the present disclosure is applied. Specifically, the computer device may include more or fewer components than those shown in the figure, or combine some components, or have a different component arrangement.

In an embodiment, a computer device is provided, including a processor and memory storing a computer program. The processor, when executing the computer program, implements the steps in the above method embodiments.

In an embodiment, a computer-readable storage medium is provided, on which a computer program is stored. The computer program, when executed by a processor, causes the processor to implement the steps in the above method embodiments.

In an embodiment, a computer program product is provided, including a computer program. The computer program, when executed by a processor, causes the processor to implement the steps in the above method embodiments.

Those of ordinary skill in the art may understand that some or all procedures in the methods in the foregoing embodiments may be implemented by a computer program instructing related hardware, the computer program may be stored in a non-transitory computer-readable storage medium, and when the computer program is executed, the procedures in the foregoing method embodiments may be implemented. Any reference to the memory, the database, or other media used in the embodiments provided in the present disclosure may include at least one of a non-transitory memory and a transitory memory. The non-transitory memory may include a read-only memory (ROM), a magnetic tape, a floppy disk, a flash memory, an optical memory, a high-density embedded non-transitory memory, a resistive random access memory (ReRAM), a magnetoresistive random access memory (MRAM), a ferroelectric random access memory (FRAM), a phase change memory (PCM), a graphene memory, and the like. The transitory memory may include a random access memory (RAM) or an external cache memory. By way of illustration instead of limitation, the RAM is available in a variety of forms, such as a static RAM (SRAM) or a dynamic RAM (DRAM). The database involved in the embodiments provided in the present disclosure may include at least one of a relational database and a non-relational database. The non-relational database may include a blockchain-based distributed database and the like, but is not limited thereto. The processor involved in the embodiments provided in the present disclosure may be a general-purpose processor, a central processing unit, a graphics processing unit, a digital signal processor, a programmable logic device, a data processing logic device based on quantum computing, and the like, and is not limited thereto.

The technical features of the above-mentioned embodiments can be combined in any way. In order to make the description concise, all possible combinations of the technical features are not described in the embodiments. However, as long as there is no contradiction in the combination of these technical features, these combinations should be considered as in the scope of the present disclosure.

The above-described embodiments only show several implementation modes of the present disclosure, and the descriptions are relatively specific and detailed, but they should not be construed as limiting the scope of the present disclosure. It should be noted that those of ordinary skill in the art can make various modifications and improvements without departing from the concept of the present disclosure, and all fall within the protection scope of the present disclosure. Therefore, the scope of the protection of the present disclosure shall be subject to the appended claims.

What is claimed is:

1. A multi-view image generation apparatus, comprising: a processing unit, a wave construction unit, a wave management unit, an execution unit (EU), a first cache unit, a second cache unit, a raster processing unit, and an image generation unit; wherein the processing unit is configured to assemble drawing data streams to obtain geometric primitives, the geometric primitives corresponding to at least one view;

the first cache unit is configured to store primitive information of the geometric primitives, the primitive information comprising the number of primitives, the number of vertices, the number of primitive bunches, and the number of waves;

the second cache unit is configured to store vertex information of the geometric primitives, the vertex information comprising a vertex position, a vertex attribute, and a vertex normal vector;

the wave construction unit is configured to construct waves according to the primitive information and the vertex information;

the EU comprises at least one computing unit;

the wave management unit is configured to schedule the waves into the computing unit for execution to perform image processing on the geometric primitives, and update the vertex information in the second cache unit according to vertex address information obtained by the image processing;

the raster processing unit is configured to rasterize the updated vertex information to obtain a corresponding two-dimensional image, and determine a view corresponding to each pixel point in the two-dimensional image; and the image generation unit is configured to generate a multi-view image according to image colors obtained by the executions of the waves and the view corresponding to each pixel point.

2. The apparatus according to claim 1, wherein data is stored in the first cache unit through a two-dimensional table, rows in the two-dimensional table in the first cache unit are configured to represent draw batches of geometric primitives, a first column is configured to represent whether valid data exists in corresponding rows, second column to the fifth column are sequentially configured to represent the number of primitives, the number of vertices, the number of primitive bunches, and the number of waves included in the geometric primitives corresponding to a current draw batch, the sixth column to the last column are sequentially configured to represent output positions of the vertices, and the number of waves is not greater than a product of the number of primitive bunches and the number of views.

3. The apparatus according to claim 2, wherein initial positions of all vertices corresponding to each draw batch are identical, the second cache unit is configured to store data through a two-dimensional table, rows in the two-dimensional table in the second cache unit are sequentially configured to represent occupied spaces of vertices in primitive bunches corresponding to views according to the initial positions, and columns are configured to represent vertex information of vertices, the occupied spaces are calculated according to the vertex information of the corresponding vertices and the number of views of the draw batches corresponding to the vertices.

4. The apparatus according to claim 2, wherein the wave management unit is further configured to request to add a new blank row to the two-dimensional table in the first cache unit, to allow the first cache unit to store the primitive information of the geometric primitives into the blank row.

5. The apparatus according to claim 1, wherein the wave construction unit is configured to determine views corresponding to the vertices of the geometric primitives, split the vertices to obtain primitive bunches corresponding to the views, and construct waves according to the primitive bunches, wherein each wave is configured to perform the image processing on one primitive bunch.

6. The apparatus according to claim 5, wherein the wave construction unit is configured to: expand the primitive bunches to correspond to the views when the number of primitive bunches reaches a preset number or the splitting of the vertices of the geometric primitives is completed, construct a wave for performing the image processing on each primitive bunch, mark the wave with the same view as the corresponding primitive bunch, and mark all waves corresponding to primitive bunches corresponding to each view with the same view name.

7. The apparatus according to claim 1, wherein the waves comprise a front-end wave and a back-end wave, the front-end wave is configured to perform front-end shading (FS) on the geometric primitives, the back-end wave is configured to perform back-end shading (BS) on the geometric primitives, the FS comprises vertex shading, hull shading, and domain shading, and the BS comprises pixel shading.

8. The apparatus according to claim 7, wherein the image generation unit is configured to generate the multi-view image according to image colors of pixel points obtained by executions of the front-end wave and the back-end wave and views corresponding to the pixel points.

9. The apparatus according to claim 1, wherein the wave management unit is configured to: schedule the waves to the computing unit for execution; perform the image processing on the vertices of the geometric primitives; after all vertices are processed, for each vertex corresponding to each view, calculate an initial position of the vertex in a current view; and generate vertex address information according to initial positions and vertex information of all vertices.

10. A graphics processing unit (GPU), comprising the multi-view image generation apparatus according to claim 1.

11. A multi-view image generation method, comprising:

assembling drawing data streams to obtain geometric primitives, the geometric primitives corresponding to at least one view, primitive information of the geometric primitives comprising the number of primitives, the number of vertices, the number of primitive bunches, and the number of waves, vertex information of the geometric primitives comprising vertex positions, vertex attributes, and vertex normal;

constructing waves according to the primitive information and the vertex information;

executing the waves to perform image processing on the geometric primitives, and updating the vertex information according to vertex address information obtained by the image processing;

rasterizing the updated vertex information to obtain a corresponding two-dimensional image, and determining views corresponding to pixel points in the two-dimensional image; and generating a multi-view image according to image colors obtained by executions of the waves and the views corresponding to the pixel points.

12. The method according to claim 11, wherein the primitive information of the geometric primitives is stored in a two-dimensional table, rows in the two-dimensional table are configured to represent draw batches of the geometric primitives, the first column in the two-dimensional table is configured to represent whether valid data exists in the corresponding rows, the second column to the fifth column in the two-dimensional table are sequentially configured to represent the number of primitives, the number of vertices, the number of primitive bunches, and the number of waves included in geometric primitives corresponding to a current draw batch, the sixth column to the last column in the two-dimensional table are sequentially configured to represent output positions of the vertices, and the number of waves is not greater than a product of the number of primitive bunches and the number of views.

13. The method according to claim 12, wherein initial positions of all vertices corresponding to each draw batch are identical, the vertex information of the geometric primitives is stored in the two-dimensional table, rows in the two-dimensional table are sequentially configured to represent occupied spaces of vertices in primitive bunches corresponding to the views according to the initial positions, and columns in the two-dimensional table are configured to represent vertex information of the vertices, the occupied spaces are calculated according to the vertex information of the corresponding vertices and the number of views in the draw batches corresponding to the vertices.

14. The method according to claim 12, further comprising: requesting to add a new blank row to the two-dimensional table, to store the primitive information of the geometric primitives into the blank row.

15. The method according to claim 11, wherein the constructing the waves according to the primitive information and the vertex information comprises: determining views corresponding to the vertices of the geometric primitives, splitting the vertices to obtain primitive bunches corresponding to the views, and constructing the waves according to the primitive bunches, wherein each wave is configured to perform the image processing on one primitive bunch.

16. The method according to claim 15, wherein the constructing waves according to the primitive bunches comprises: expanding the primitive bunches to correspond to the views when the number of primitive bunches reaches a preset number or the splitting of the vertices of the geometric primitives is completed, constructing a wave for the image processing on each primitive bunch, marking the wave with the same view as the corresponding primitive bunch, and marking all waves corresponding to the primitive bunches corresponding to each view with the same view name.

17. The method according claim 11, wherein the waves comprise a front-end wave and a back-end wave, the front-end wave is configured to perform front-end shading (FS) on the geometric primitives, the back-end wave is configured to perform back-end shading (BS) on the geometric primitives, the FS comprises vertex shading, hull shading, and domain shading, and the BS comprises pixel shading.

18. The method according claim 17, wherein the generating the multi-view image according to the image colors obtained by the executions of the waves and the views corresponding to the pixel points comprises: generating the multi-view image according to the image colors of the pixel points obtained by executions of the front-end wave and the back-end wave and the views corresponding to the pixel points.

19. The method according claim 11, wherein the executing the waves to perform the image processing on the geometric primitives further comprises: executing the waves to perform the image processing on the vertices of the geometric primitives, after all vertices are processed, for each vertex corresponding to each view, calculating an initial position of the vertex in a current view, and generating vertex address information according to initial positions and vertex information of all vertices.

\* \* \* \* \*